United States Patent [19]

Strader

[11] Patent Number: 4,481,997

[45] Date of Patent: Nov. 13, 1984

[54] TIRE AND RIM COMBINATION WITH SAFETY INSERT

[75] Inventor: Don S. Strader, Lansing, Mich.

[73] Assignee: Motor Wheel Corporation, Lansing, Mich.

[21] Appl. No.: 439,565

[22] Filed: Nov. 5, 1982

Related U.S. Application Data

[60] Division of Ser. No. 293,099, Aug. 17, 1981, abandoned, which is a continuation-in-part of Ser. No. 192,337, Sep. 29, 1980, Pat. No. 4,327,791.

[51] Int. Cl.³ ............... B60B 25/08; B60B 25/10; B60B 25/20
[52] U.S. Cl. .................. 152/401; 152/411; 152/DIG. 10
[58] Field of Search .......... 152/158, 400, 401, 402, 152/403, 405, 411, DIG. 10

[56] References Cited

U.S. PATENT DOCUMENTS

| 1,957,690 | 5/1934 | Brousseau . | |
|---|---|---|---|
| 2,410,573 | 11/1946 | Eksergian . | |
| 2,424,918 | 7/1947 | Brown | 152/401 |
| 2,969,825 | 1/1961 | Sinclair et al. . | |
| 2,989,108 | 6/1961 | Gore | 152/158 |
| 3,007,507 | 11/1961 | Sinclair et al. . | |
| 3,882,919 | 5/1975 | Sons et al. | 152/410 |
| 4,144,922 | 3/1979 | Strader | 152/410 |
| 4,177,849 | 12/1979 | Osada et al. | 152/158 |
| 4,216,810 | 8/1980 | Osada et al. | 152/158 |
| 4,372,365 | 2/1983 | Osada et al. | 152/158 |

FOREIGN PATENT DOCUMENTS 811014 3/1959 United Kingdom .

Primary Examiner—David A. Scherbel
Attorney, Agent, or Firm—Barnes, Kisselle, Raisch, Choate, Whittemore & Hulbert

[57] ABSTRACT

A safety tire and wheel assembly which includes an improved multiple-piece wheel rim assembly for preventing inflation and/or venting to atmosphere when the rim assembly components are improperly assembled, and an improved safety insert mounted on the wheel rim base for supporting the tire tread during operation following loss of inflation pressure. The wheel rim assembly includes telescoping rim segments and an O-ring normally captured in compression between opposing portions of the rim segments for sealing the tire cavity. Air bleed passages are formed in one rim segment adjacent the sealing ring externally of the cavity to vent the tire cavity to atmosphere when sealing compressive stresses are absent from the O-ring as in the event of improper assembly or disassembly. The safety insert includes a ledge normally disposed within the tire cavity and having a radially facing surface roughened by a circumferential series of axially extending splines. Encapsulated lubricant is carried by the insert in a position to be fractured by the tire tread upon loss of inflation pressure so that the lubricant is spread over the tread-engaging insert surface and retained adjacent the surface between the splines.

12 Claims, 6 Drawing Figures

TIRE AND RIM COMBINATION WITH SAFETY INSERT

This is a division of application Ser. No. 293,099 filed Aug. 17, 1981 and now abandoned, which was a continuation-in-part of application Ser. No. 192,337 filed Sept. 29, 1980, now U.S. Pat. No. 4,327,791.

FIELD OF INVENTION

The present invention relates to wheel assemblies for pneumatic tubeless tires, and more particularly to safety tire and wheel assemblies and methods of a type adapted for continued operation upon loss of air pressure in the tire. Yet more specifically, the invention relates to wheel rim assemblies of the type having a removable flange ring for mounting or demounting of a tubeless pneumatic tire thereon, and to a safety insert device adapted to be disposed internally of a tire mounted on such a rim for supporting the tire tread in the deflated condition.

BACKGROUND AND OBJECT OF THE INVENTION

In safety tire and wheel assemblies which include inserts of the described type, the insert conventionally comprises a base portion disposed adjacent to the wheel rim and a second portion projecting radially from the rim into the tire cavity or chamber. Upon loss of air pressure in the chamber, the tire tread collapses against the second portion of the insert, such that the insert supports the tire tread with respect to the rim for continued operation of the vehicle. Friction due to relative motion between the tire tread and the tread-supporting portion of the safety insert often causes overheating and destruction of the insert during continued operation. This problem has been alleviated to some extent, but not entirely overcome, by disposition of solid or liquid lubricant along the tread-supporting surface of the insert. However, the relatively soft material of the carcass liner tends to squeeze the lubricant from between the liner surface and insert, so that the engaging insert and tire surfaces eventually are substantially unlubricated.

A goal in the vehicle industry has been to provide a safety tire and wheel assembly which will operate at a vehicle speed of 30 miles per hour over a distance of 30 miles following loss of tire pressure without destruction of the tire or wheel. With the exception of the safety tire and wheel assembly disclosed in the above-referenced copending application, of which this application is a continuation-in-part, and the disclosure of which is incorporated herein by reference, these industry goals or specifications have not been well met by the safety assemblies previously proposed. The safety assembly disclosed in the referenced copending application has been found to satisfy the described industry goal, but comprises a number of assembly components which contribute to the overall weight and expense of the insert.

It has heretofore been recognized in the art that multiple-piece wheel rim assemblies, considered alone or in combination with safety inserts of the above-described type, may present a significant safety hazard if it is attempted to inflate a tire mounted thereon when the various rim assembly components are improperly positioned or seated, or to disassemble the rim when the tire mounted thereon is inflated. This problem is particularly acute in the case of high pressure track tires and the like.

One important object of the present invention is to provide a safety tire and wheel assembly and method, and a safety insert adapted for use therein, which are adapted for operation at a vehicle speed of at least 30 miles per hour for a distance of at least 30 miles following loss of tire pressure, and which are less expensive and lighter in weight than assemblies, methods and inserts heretofore proposed capable of approaching or achieving this industry goal.

Another object of the invention is to provide a safety insert for a pneumatic tire and wheel assembly which is rugged in operation, and yet is light in weight and does not substantially alter the dynamic and static wheel and tire balance characteristics.

A further object of the invention is to provide a wheel rim assembly for tubeless pneumatic tires, including safety tire and wheel assemblies of the above-described type, which prevents inflation of a tire mounted on the rim assembly when the rim assembly components are improperly positioned and/or which automatically vents the tire cavity to atmosphere should disassembly be attempted when the tire mounted thereon is inflated.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

In the following description and claims, directional adjectives such as "inboard" and "outboard" are taken with reference to preferred orientation of mounting of the wheel, etc. on a vehicle, and no undue limitations should be inferred therefrom where such directional adjectives are not essential to operation of the structural and functional features of the invention.

Figure 1:
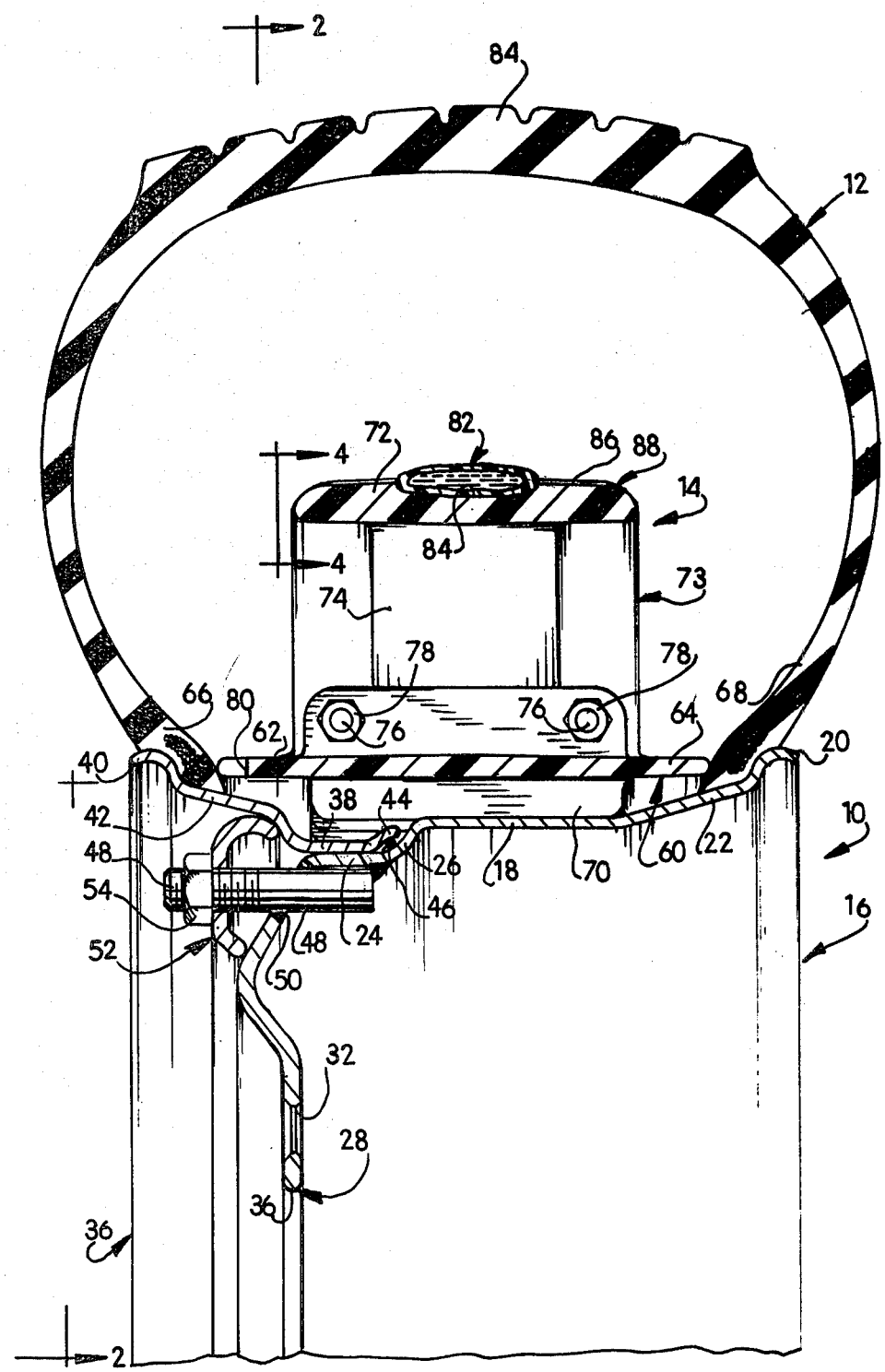
FIG. 1 is a sectional view of a presently preferred embodiment of the safety tire and wheel assembly provided by the invention taken in a radial plane substantially along the line 1—1 in FIG. 2.
Figure 2:
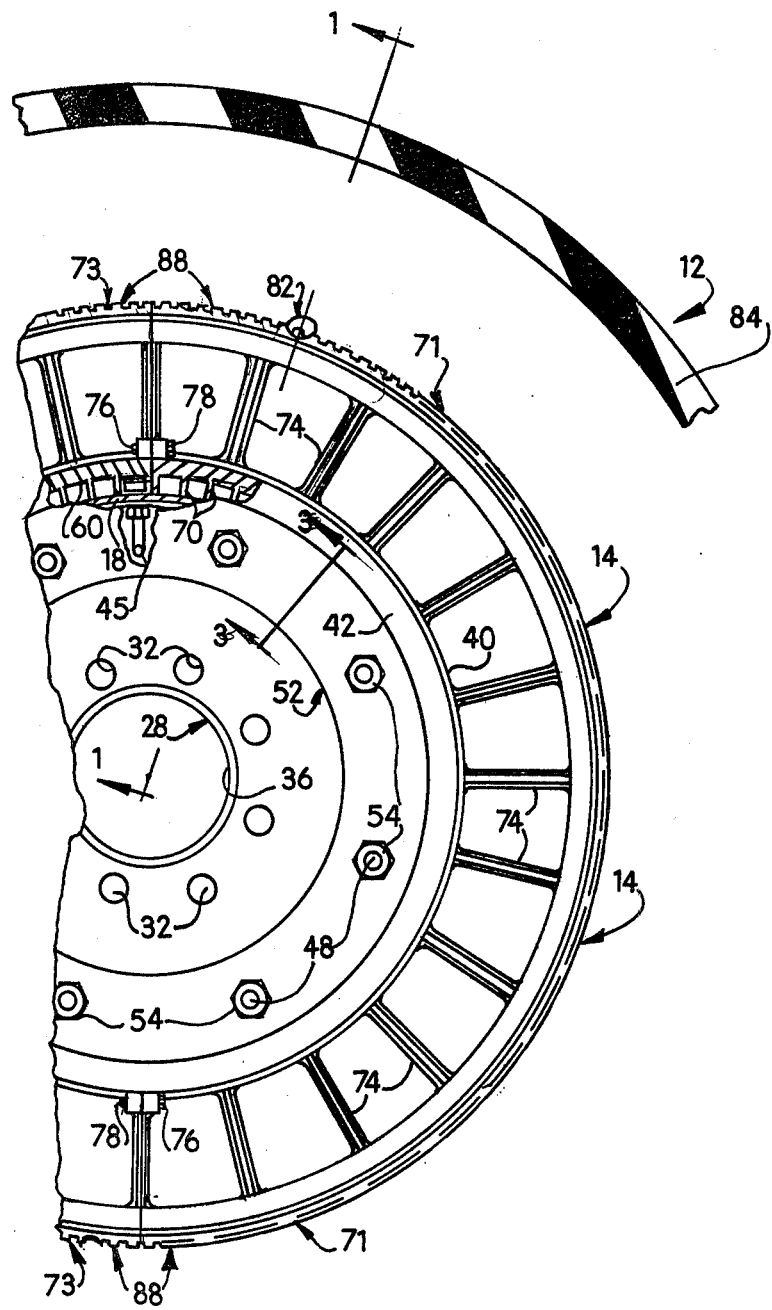
FIG. 2 is a fragmentary partially sectional and partially elevational view of the tire and wheel assembly as viewed substantially along the line 2—2 in FIG. 1.
Figure 3:
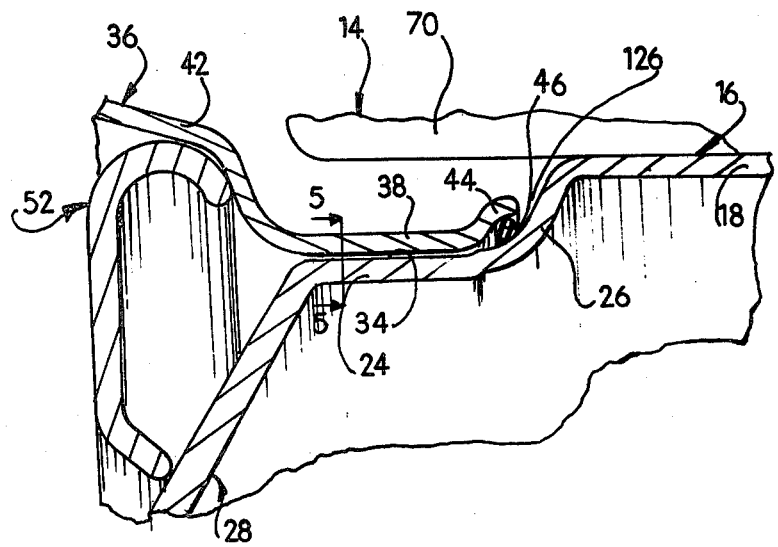
FIG. 3 is a fragmentary sectional view on an enlarged scale taken substantially along the line 3—3 in FIG. 2.

FIGS. 1-5 illustrate a presently preferred embodiment of a safety tire and wheel assembly in accordance with the invention as comprising a wheel assembly 10, a tubeless pneumatic tire 12 mounted thereon and a safety insert 14 carried by wheel assembly 10 internally of tire 12 for supportin the latter in the event of tire deflation. Wheel assembly 10 includes a first rim segment 16 having a cylindrical rim base 18 and an inboard bead retaining flange 20 integrally projecting therefrom and coupled thereto by a 15° beam seat 22. A circumferentially continuous cylindrical band 24 has a diameter which is less than that of rim base 18 and is coaxially integrally connected thereto by the radially outwardly and axially inwardly angulated shoulder 26. A circumferential array of axially extending air bleed passages or channels 34 (FIGS. 3 and 4) are formed as radial depressions in the cylindrical outer surface of band 24 at a preferred spacing of substantially 45°. As best seen in FIG. 3, channels 34 extend axially throughout the cylindrical portion of band 24 but not into the angulated shoulder 26.

A wheel mounting disc generally indicated at 28 is integral with an edge of band 24 remote from flange 22, and includes hub opening 30 and stud opening 32 for mounting wheel assembly 10 on a vehicle in the usual manner. As best seen in FIG. 1, disc 28 tapers uniformly in thickness from a maximum in the region of hub opening 30 and stud opening 32 to a minimum at the outermost disc edge integral with rim segment 16. Rim segment 16 is of substantially uniform thickness throughout. Rim segment 16 with integral disc 28 may be formed in a blanking and spinning operation, followed by a forming operation in which channels 34 are stuck in rim band 24 at a spacing of 45° from each other.

Wheel assembly 10 further includes a second rim segment 36 which comprises a cylindrical hoop 38 adapted to be slidably and telescopically received over band 24, and an outboard bead retaining flange 40 integrally coupled to hoop 38 by the outboard 15° bead seat 42. A lip 44 projects axially inwardly and radially outwardly from the flange-remote edge of band 38 for sealingly capturing in assembly against shoulder 26 an annular resilient O-ring seal 46. A plurality of threaded studs 48 are affixed as by welding internally of band 24 on rim segment 16 and project axially outwardly therefrom through corresponding openings 50 (FIG. 1) in disc 28. Studs 48 are preferably spaced 45° from each other and symmetrically alternate in circumferential position with air bleed channels 34. That is, each air bleed channel 34 is struck in the forming of rim segment 16 mid-way between an associated pair of disc openings 50. An annular clamping ring 52 is received over the outboard ends of studs 48, and a plurality of locknuts 54 are received over the corresponding threaded stud ends for clamping rim segment 36 onto rim segment 16, with O-ring 46 being captured in compression between lip 44 and shoulder 26.

With the rim segments assembled as shown in FIG. 1, the internal cavity of tire 12 is sealed by O-ring 46 so that the tire may be inflated through valve 45 (FIG. 2) and operated in the usual manner. If clamping ring 52 and rim segment 36 are not in the fully assembled condition, or if it is attempted to dissassemble rim segment 36 by removal of nuts 54 with the tire inflated, compression forces on sealing ring 46 are removed and any pressurized air within or entering the tire cavity is vented to atmosphere past the O-ring and between hoop 38 and band 24 through air bleed channels 34. It will be noted in particular in accordance with a preferred embodiment of the invention that sufficient threads extend from nuts 54 in the fully assembled positions of nuts 54 thereon that, in the event that the nuts are loosened during a disassembly operation with the tire inflated, lip 44 on rim segment 36 will move out of sealing engagement with O-ring 46 and thereby vent the tire cavity to atmosphere through air bleed passages 34 before all of the nuts 54 are removed from studs 48.

Safety insert 14 comprises an inner band 60 extending around rim base 18. Band 60 has axially projecting outboard and inboard edges 62, 64 which engage respective bead toes 66, 68 of tire 12 and clamp such bead toes against corresponding outboard and inboard bead retaining flanges 40, 20. A plurality of axially extending ribs 70 project radially inwardly from band 60. Insert 14 further includes an outer band or ledge 72 integrally mounted coaxially with inner band 60 by a circumferential array of axially extending circumferentially spaced support struts or columns 74. As best seen in FIG. 1, insert 14 is generally I-shaped as viewed in radial cross section, and is centrally and symmetrically positioned with respect to the axial center line or plane of wheel 10. The volume between circumferentially adjacent columns 74, and between ledge 72 and band 60 is devoid of core material for reducing overall weight added to the tire and wheel assembly by the safety insert. Insert 14 is preferably constructed of two identical semi-circular core segments 71, 73 of fiber-reinforced synthetic resin material. Core segments 71, 73 are joined end to end by the bolts 76 and nuts 78, such that ribs 70 projecting inwardly from inner band 60 are tightly and non-rotatably clamped against the outer surface of rim base 18. Notches 80 (FIG. 1) are formed in the edges of inner band 60 for providing air communication between the tire cavity proper and the region immediately adjacent sealing ring 46 and air bleed safety passages 34.

A container or shell 82 (FIGS. 1 and 2) of non-water base liquid lubricant is mounted in a recess 84 on the radially outer surface of each core segment 71, 73 in a position to be engaged and ruptured by the inner surface of tire tread 84 in the event of loss of tire inflation pressure. At least one lubricant container 82 is mounted on each core segment, preferably at diametrically opposed positions for balance. In accordance with an important feature of the present invention, the radially outwardly facing surface 86 of ledge 72 is roughened entirely around the ledge surface as with a multiplicity of microscopic pockets. These pockets function to retain lubricant at the ledge surface against the forces exerted thereon by the tire during run flat operation which would otherwise tend to squeeze the lubricant from between the engaged tire and core surfaces. In the preferred embodiment of the invention illustrated in the drawings, such microscopic pockets are formed as a multiplicity of axially oriented splines 88 extending in a circumferential series entirely around the outer ledge surface. The recesses or channels 89 between splines 88 have a dimension C in the circumferential direction which is insufficient to permit complete entry of carcass liner material 84 (FIG. 4) during run flat operation so that lubricant will be retained therein. A circumferential length L (FIG. 4) and depth D of one millimeter on each spline 88, and a circumferential length C of one millimeter of each recess 89, are presently preferred. Most preferably, the outer edges of splines 88 are rounded so as to prevent abrasion of the internal surface of the tire tread. Such edges may be rounded at a radius of 0.25 mm in the preferred embodiment. Thus, in the preferred form of the invention illustrated in FIGS. 1, 2 and 4, insert surface 86 comprises a circumferentially symmetricaly series of crowns and recesses or channels of equal dimension. Other roughened or irregular surfaces are contemplated, including the roughened surface resulting from sand casting a core constructed of aluminum, for example.

Figure 4:
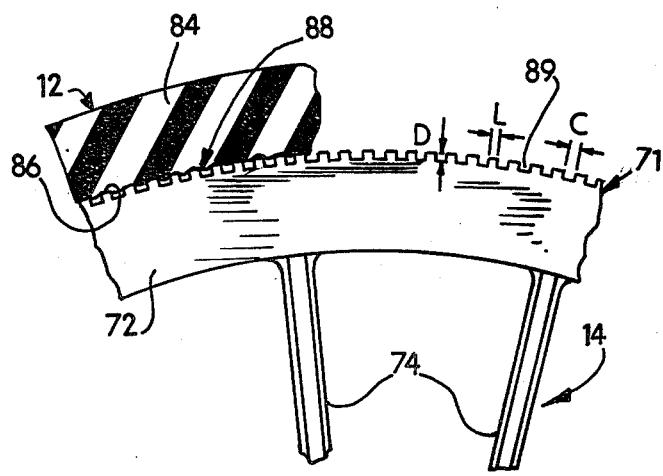
FIG. 4 is a fragmentary elevational view on an enlarged scale as viewed substantially along the line 4—4 in FIG. 1.
Figure 6:
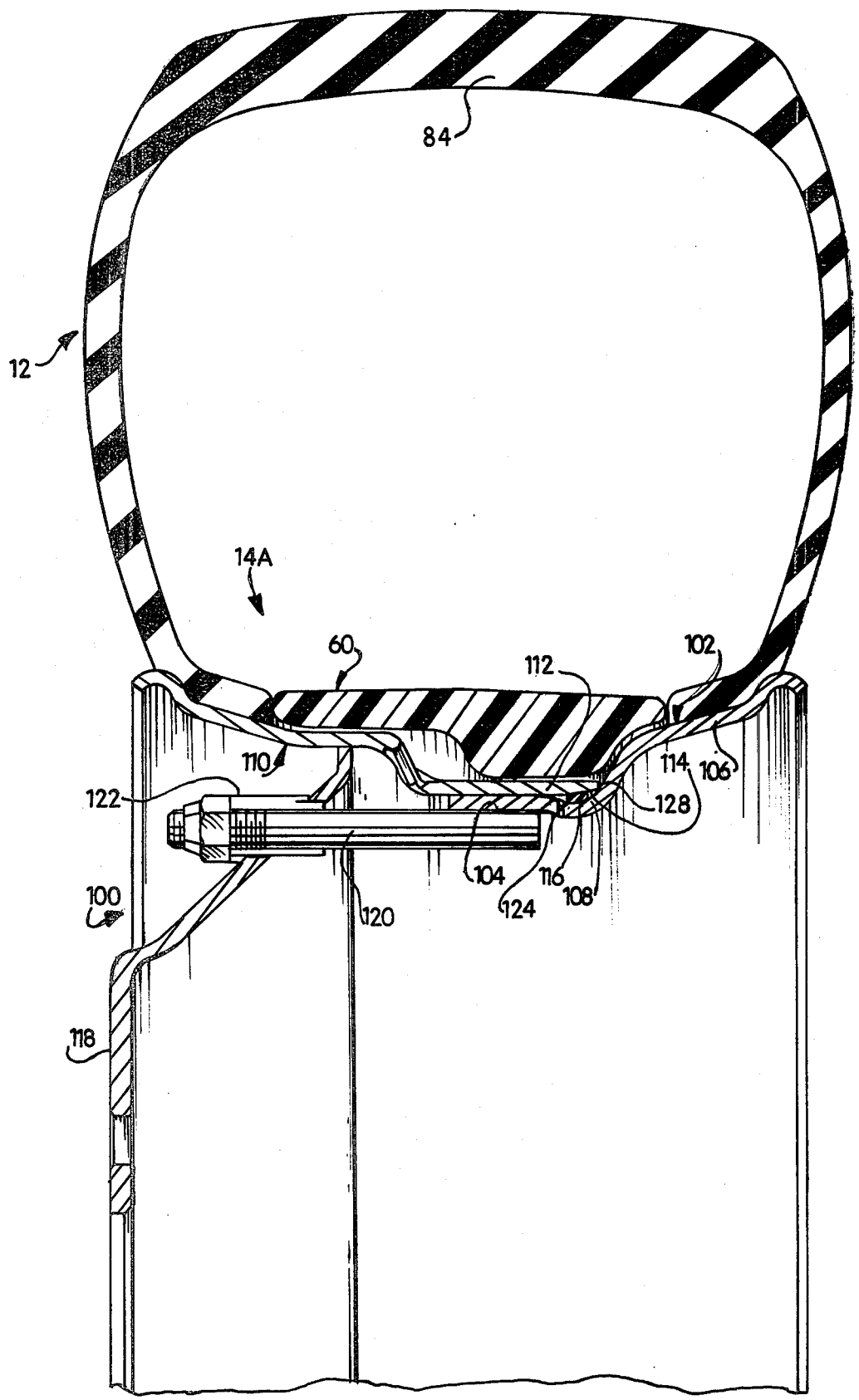
FIG. 6 is a view similar to that of FIG. 1 showing a modified safety tire and wheel assembly in accordance with the invention.

FIG. 6 illustrates a modified embodiment of the invention wherein a one-piece safety insert 14a is modified compared with that illustrated in FIGS. 1-2 and 4 by elimination of the outer ledge 72 and supporting struts 74. Insert 14a, which includes inner band 60, is thus adapted during run flat operation to clamp the tire bead toes 66, 68 firmly against the corresponding bead retaining flanges so that the tire will not become disassembled from the wheel.

FIG. 6 also illustrates a modified wheel assembly 100 in accordance with the invention as comprising an inboard rim segment 102 having a band 104 coupled to the bead seat 106 by the circumferential depression 108. The outboard rim segment 110 includes a cylindrical hoop 112 received over band 104. The radially and axially inner surface 114 of hoop 112 is frustoconical and sealingly captures an O-ring 116 in depression 108. A separate disc 118 is internally welded to outboard rim segment 110.

Figure 5:
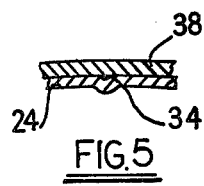
FIG. 5 is a sectional view taken along the line 5—5 in FIG. 3.

A circumferential array of threaded studs 120 are internally welded to band 104 and project through corresponding openings in disc 118. An insert 122 is telescopically received over each stud 120 and engages the angulated outboard face of disc 118 to provide for flush surface engagement by locknut 54 in a plane perpendicular to the stud axis (and wheel axis). The air bleed channels 34 of FIGS. 3 and 5 are replaced in FIG. 6 by openings or apertures 124 extending radially through recess 108 ouboard of sealing ring 116.

It will thus be appreciated that a wheel assembly has been provided in accordance with a first important aspect of the present invention, in particular a multiple-piece rim assembly. In the embodiments disclosed, the wheel assembly includes air bleed passages (34 in FIGS. 1-5 and 124 in FIG. 6) for preventing inflation of a tire mounted thereon and/or automatically deflating a tire mounted thereon when the rim segments are not properly assembled. Specifically, an O-ring (46 or 116) compressed between an inboard edge surface (44 or 114) on the demountable rim segment (36 or 110) and the opposing portion (26 or 108) on the second rim segment (16 or 102) normally seals the tire cavity. In the event that such compression is absent because the rim components are improperly assembled or tightened, or the compression forces are removed by loosening of the locknuts 54, the tire cavity is effectively vented to atmosphere through the air bleed passages.

Although the multiple-piece wheel rim and wheel of the invention are contemplated as having general utility in applications such as truck wheels where multiple-piece wheel rims of other configurations are generally utilized, it will be recognized that the multiple-piece rim of the invention has particular utility in combination with a run flat safety insert which includes a substantially incompressible portion (60 in FIGS. 1 and 6) for clamping the tire bead toes against the bead retaining flanges. This particular utility arises from the fact that the demountable rim segment 36 in the rim assembly of the invention need not be positioned axially inwardly of its final position during the assembly operation as is the case with many multiple-piece rims of conventional types. Thus, the rim assembly of the invention cooperates with a bead toe-clamping safety insert during the process of assembling the entire insert tire and wheel assembly.

Note also that the use of angulated surfaces on one or both of the rim segments for engaging the sealing ring provides accommodation for substantial variation within manufacturing tolerances on the wheel, insert and tire components. In FIG. 3, the separation at 126 illustrates the point of minimum O-ring compression, corresponding to a maximum distance between bead flanges 20,40 (FIG. 1). On the other hand, axial abutment of rim segments at 128 (FIG. 6) illustrates the point of minimum spacing between bead flanges.

In accordance with another important aspect of the present invention, there is provided an improved run flat safety insert which includes a multiplicity of microscopic pockets or recesses for retaining lubricant at the engaging insert and tire tread surfaces, and thereby minimizing the frictional heating which would otherwise result due to relative circumferential movement between these two surfaces. The pockets or recesses are of dimension sufficiently small to prevent filling of the pockets or recesses by tread liner material so as to displace or squeeze out contained lubricant. The improved safety insert so provided overcomes problems noted in prior art inserts of generally similar type whereby lubricant initially distributed over the tire-engaging surface of the insert during the run flat mode of operation is eventually squeezed or forced off of the insert surface by the forces of the tire tread pressed thereagainst, so that substantial frictional heating and possible destruction and failure of the core and/or tire may result.

The invention claimed is:

1. A wheel rim assembly for use in a safety tire and wheel assembly which includes a pneumatic tubeless tire and an axially incompressible safety insert for retaining the tire bead toes on said rim assembly in the event of loss of inflation pressure in the tire, said wheel rim assembly comprising rim base means including a rim base, a bead retaining flange integrally carried at an inboard edge of said rim base and a cylindrical band at a flange-remote edge of said rim base at a diameter less than that of the adjacent edge of said rim base, demountable flange means including a cylindrical hoop adapted to be telescopically received from an axially outboard direction over said band, outboard bead retaining flange means integrally projecting from one edge of said hoop and an inboard edge, annular resilient sealing means disposed between said inboard edge and an opposing surface of said rim base means, means for axially clamping said demountable flange means on said rim base means with said sealing means being captured in compression between said inboard edge and said opposing surface so as to seal against air leakage, and air bleed passage means in said band outboard of sealing means and normally sealed from the tire cavity by said sealing means, said clamping means being constructed and adapted to engage and exert clamping stress on said demountable flange means over a range of relative movement therebetween in the axial direction of said rim base means which is sufficient to permit loss of sealing pressure at said sealing means prior to loss of clamping engagement at said clamping means and thereby permitting air leakage past said sealing means through said air bleed passage means to atmosphere within said range of relative movement.

2. The wheel rim assembly set forth in claim 1 wherein said inboard edge includes a conical surface engaging said sealing means for accommodating dimensional variations in said tire bead toes, safety insert, rim base means and demountable flange means.

3. The wheel rim assembly set forth in claim 1 further comprising a wheel mounting disc integral with said band.

4. A wheel rim assembly for pneumatic tubeless tires comprising rim base means including a generally cylindrical rim base, first flange means carried at one edge of said rim base and a cylindrical band at a flange-remote edge of said rim base with a diameter which is less than that of said rim base; demountable flange means including a cylindrical hoop received over said band, second flange means carried at one edge of said hoop and radially and axially inwardly facing conical surface means at a flange-remote edge of said hoop; circumferentially continuous resilient sealing means disposed between said surface means and an opposing surface on said rim base means; means for releasably clamping said demountable flange means on said rim base means with said sealing means captured in compression between said surface means and said opposing surface for normally sealing the internal cavity of a tire mounted on said wheel rim assembly; and air bleed passage means in said band, said clamping means being constructed and adapted to engage and exert clamping stress on said demountable flange means over a range of relative movement therebetween in the axial direction of said rim base means which is sufficient to permit loss of sealing pressure at said sealing means prior to loss of clamping engagement at said clamping means and thereby permitting air leakage past said sealing means through said air bleed passage means to atmosphere within said range of relative movement.

5. The wheel rim assembly set forth in claim 4 wherein said air bleed passage means comprises at least one channel extending in the axial direction in the radially outer face of said band and being recessed radially inwardly of said band diameter.

6. The wheel rim assembly set forth in claim 4 wherein said air bleed passage means comprises at least one radial opening extending through said band.

7. The wheel rim assembly set forth in claim 4 further comprising a wheel mounting disc integral with said band.

8. A wheel rim assembly for pneumatic tubeless tires comprising rim base means including a generally cylindrical rim base, first flange means carried at one edge of said rim base and a cylindrical band at a flange-remote edge of said rim base with a diameter which is less than that of said rim base; demountable flange means including a cylindrical hoop received over said band, second flange means carried at one edge of said hoop and radially and axially inwardly facing conical surface means at a flange-remote edge of said hoop; circumferentially continuous resilient sealing means disposed between said surface means and an opposing surface on said rim base means; means for releasably clamping said demountable flange means on said rim base means with said sealing means captured in compression between said surface means and said opposing surface for normally sealing the internal cavity of a tire mounted on said wheel rim assembly; and air bleed passage means in said band, improper mounting of said demountable flange means on said rim base means permitting air leakage past said sealing means through said air bleed passage means to atmosphere; said clamping means comprising first threaded means carried by said rim base means and means including second threaded means adapted to be received by said first threaded means, said first and second threaded means being dimensioned in the axial direction of said rim base means sufficiently to permit loss of sealing engagement at said sealing means prior to loss of threaded engagement at said threaded means upon loosening of said threaded means.

9. The wheel rim assembly set forth in claim 8 wherein said first threaded means comprises a plurality of threaded studs affixed in a circumferential array to said band, and wherein said second threaded means comprises a plurality of nuts received onto said studs, the threaded length of said studs being such as to permit loss of sealing at said sealing means before said nuts are removed from said studs.

10. A safety tire and wheel assembly comprising a vehicle wheel including a wheel rim having axially spaced bead flanges and a rim base; a tire having axially spaced bead toes and a circumferential tire tread; and safety means including an axially incompressible first portion extending circumferentially around said rim and having axially spaced side edges clamping said bead toes against said bead flanges such that said tire tread is spaced radialy outwardly of said rim base to define a tire cavity, said wheel rim including means for inflating said tire cavity and means for preventing inflation of said tire cavity in the event of improper assembly of said safety tire and wheel assembly; said wheel rim comprising a first rim segment including one of said bead flanges, a second rim segment including the second of said bead flanges adapted to be telescopically axially received over said first rim segment, annular sealing means disposed between opposing portions of said first and second rim segments and means for clamping said second rim segment onto said first rim segment with said annular sealing means captured in compression between said portions of said rim segments for sealing said tire cavity, and wherein said means for preventing inflation comprises air bleed passages in one of said first and second rim segments for venting said cavity to atmosphere in the event of loss of sealing engagement at said sealing means; said clamping means comprising first threaded means carried in fixed position relative to said first rim segment, and second means adapted for threaded fastening engagement with said first threaded means, said first and second means being dimensioned to permit loss of sealing engagement at said sealing means and venting of said cavity to atmosphere through said air bleed passages while said first and second means are threadably engaged in the event of loosening of said first and second means.

11. The wheel rim assembly set forth in claim 10 further comprising a wheel mounting disc integral with said band.

12. A safety tire and wheel assembly comprising a vehicle wheel including a wheel rim having axially spaced bead flanges, and a rim base; a tire having axially spaced bead toes and a circumferential tire tread; and safety means including an axially incompressible first portion extending circumferentially around said rim and having axially spaced side edges clamping said bead toes against said bead flanges such that said tire tread is spaced radially outwardly of said rim base to define a tire cavity, said wheel rim including means for inflating said tire cavity and means for preventing inflation of said tire cavity in the event of improper assembly of said safety tire and wheel assembly; said wheel rim comprising a first rim segment including one of said bead flanges, a second rim segment including the second of said bead flanges adapted to be axially assembled to said first rim segment, annular sealing means adapted to be disposed between opposing portions of said first and second rim segments and means for releasably clamping said second rim segment onto said first rim segment with said annular sealing means captured in compression between said portions of said rim segments for sealing said tire cavity, said means for preventing inflation comprising air bleed passage means in one of said first and second rim segments for venting said cavity to atmosphere in the event of loss of sealing engagement at said sealing means; said clamping means being adapted to engage and exert clamping stress on said second rim segment over a dimension in the axial direction of said first rim segment which is sufficient to permit loss of sealing pressure at said sealing means prior to loss of clamping engagement at said clamping means, permitting air leakage past said sealing means through said air bleed passage means to atmosphere.

* * * * *